United States Patent
Box

[11] 3,971,314
[45] July 27, 1976

[54] SKATEWHEEL CONVEYOR PALLET

[76] Inventor: Theodor Max Box, 1108 Aileen Road, Brielle, N.J. 08730

[22] Filed: Apr. 2, 1975

[21] Appl. No.: 564,375

[52] U.S. Cl. .............................. 104/135; 108/51.1; 193/35 A
[51] Int. Cl.² ........................................ B65D 19/00
[58] Field of Search .............. 193/35 R, 35 A, 35 C; 214/16.1 C, 16.1 CD, 16.1 CF; 104/135, 163, 168; 108/51, 52, 53, 58

[56] References Cited
UNITED STATES PATENTS

| | | | |
|---|---|---|---|
| 2,771,200 | 11/1956 | Gilliard | 108/51 X |
| 2,949,863 | 8/1960 | Cozzoli | 104/135 |
| 3,010,409 | 11/1961 | De Good et al. | 104/135 |
| 3,026,817 | 3/1962 | Sebastian et al. | 104/135 |
| 3,245,510 | 4/1966 | Cowan | 193/35 A |
| 3,338,175 | 8/1967 | Hardy et al. | 104/134 X |
| 3,680,495 | 8/1972 | Pike | 108/53 |

*Primary Examiner*—John J. Love
*Assistant Examiner*—James L. Rowland

[57] ABSTRACT

This invention relates to pallets employed in materials handling on wheel conveyors, also known as skate or skatewheel conveyors, and more particularly to a pallet which is self-guiding along the conveyor.

3 Claims, 8 Drawing Figures

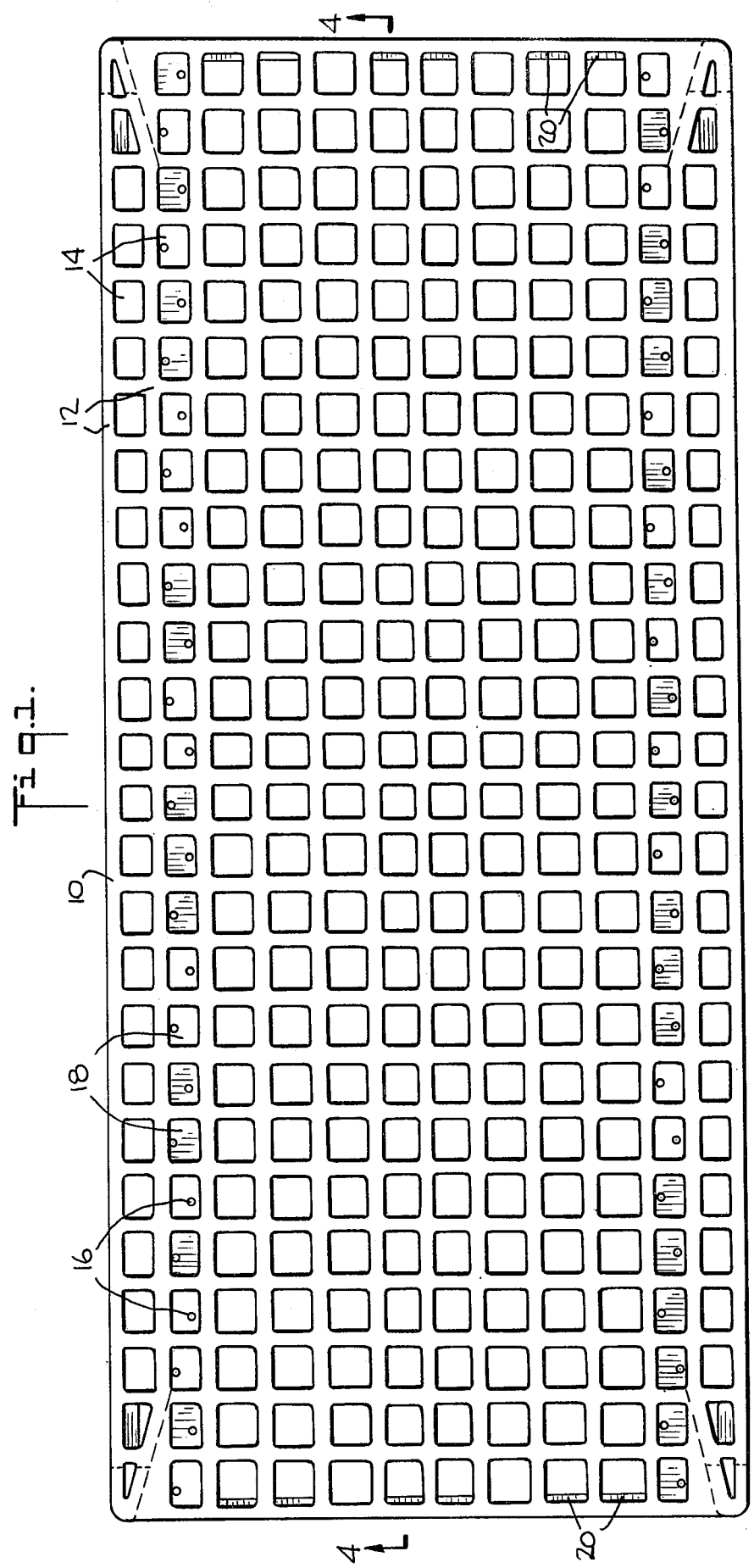

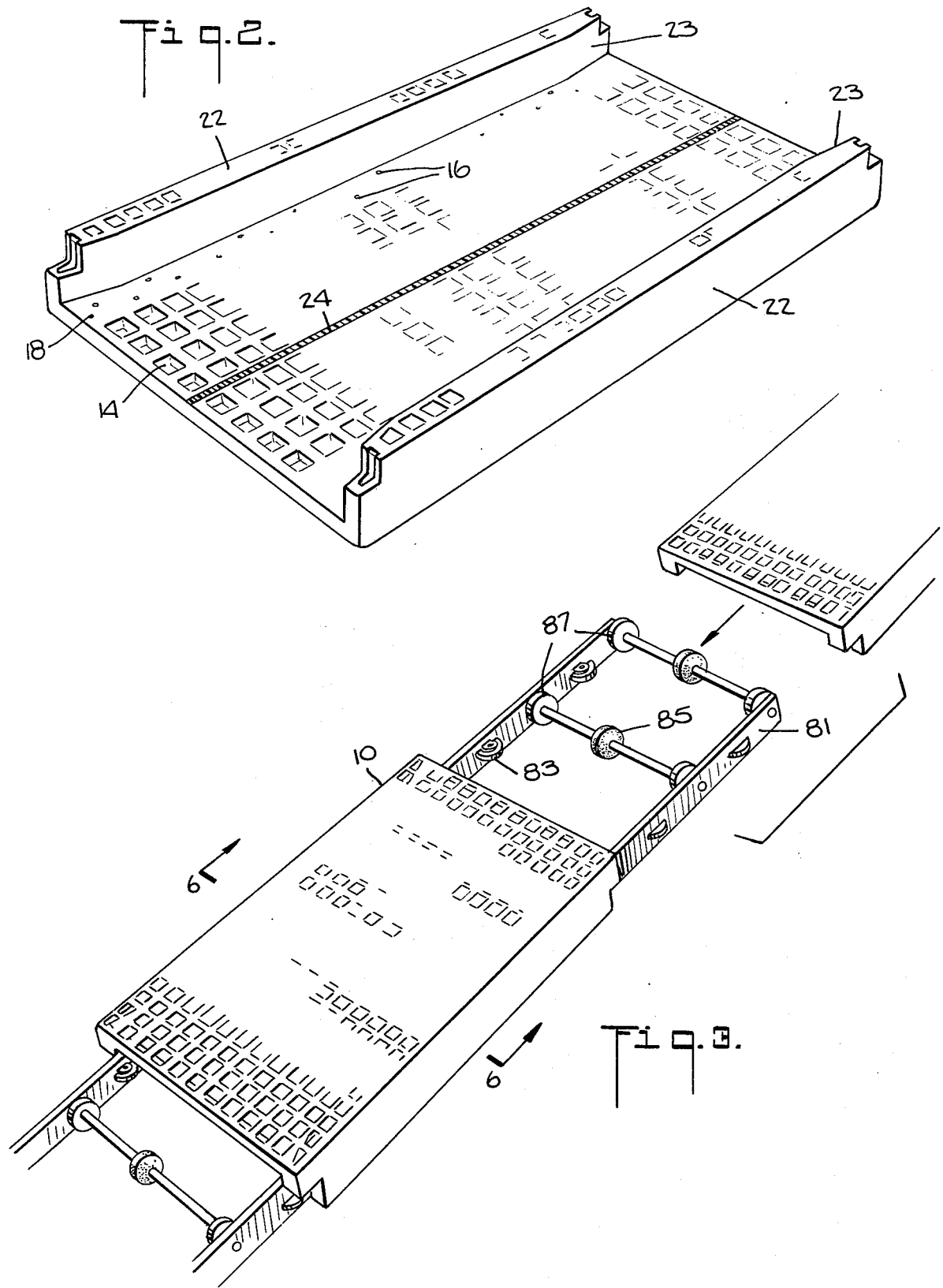

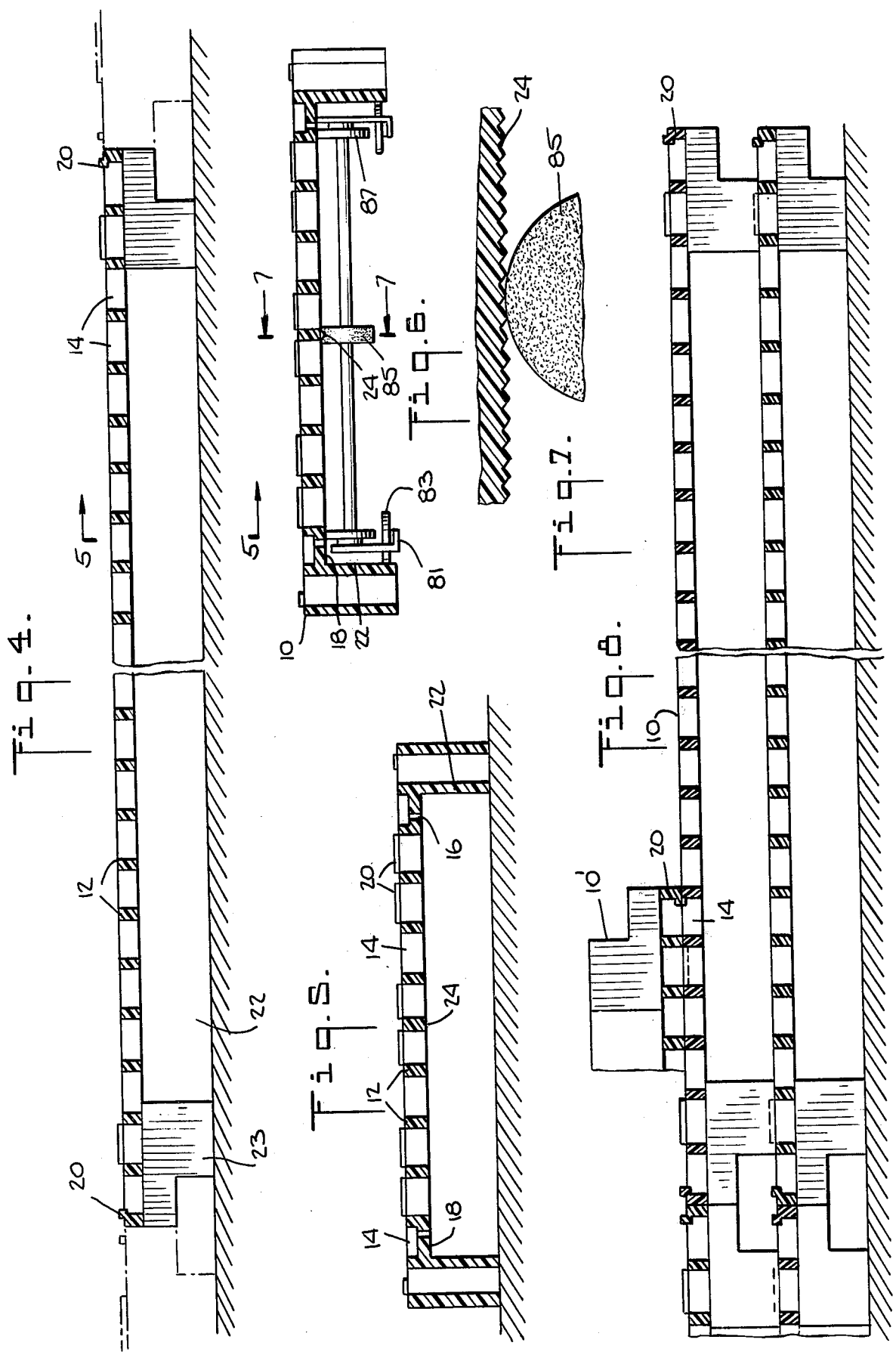

SKATEWHEEL CONVEYOR PALLET

BACKGROUND OF THE INVENTION

Skatewheel conveyors generally in use usually consist of two light channels braced to form a frame and having a series of wheels on rigid through shafts mounted between the sides. Package or objects can be moved manually or by gravity on these conveyors. The load must have a rigid riding surface. For example, bags and sacks have been conveyed by placing a smooth support, such as a piece of cardboard, under each bag. In such an operation there is always the possibility that the load will fall off the conveyor despite the tendency for straight wheels to advance the load at right angles to the axes of the wheels. When loads are permitted to travel by gravity in such an operation, the grades required depend largely upon the weight of the object or package and the nature of the riding surface. Skatewheel-type conveyors are ideally adapted to light loads because the light-weight wheels permit grades about half those required for roller conveyors. Since there is no way of controlling the speed of these loads, if either the package or its contents are fragile, damage may result if heavy loads are allowed to travel by gravity; likewise, the loads may gain too much momentum and as a result jump off the conveyor.

BRIEF SUMMARY OF THE INVENTION

The present invention is directed to a skatewheel conveyor pallet in which skirt members along opposite side edges of the pallet guide the pallet along the conveyor. The invention is further directed to a skatewheel conveyor pallet in which skirt members along opposite side edges of the pallet are adapted to feed the conveyor frame into the guiding skirt members.

The invention is further directed to a skatewheel conveyor pallet in which provision is made for controlling the speed of the pallet on the conveyor. In one form of the invention, a gear-toothed rack extending centrally along the underside of the pallet engages rubber wheels on the conveyor whereby the speed of the pallet along the conveyor is reduced.

The invention is still further directed to a skatewheel conveyor pallet in which provision is made for stacking thereof with similar pallets in an inverted position. The design is such that the stacked pallets will not slide relative to each other. In one form of the invention, raised stops at opposite ends of load bearing surface mate into grid openings extending through the pallet.

The above and other novel features of the invention will appear more fully hereinafter from the following detailed description when taken in conjunction with the accompanying drawings.

BRIEF DESCRIPTION OF THE DRAWINGS

In the drawings, wherein like reference characters indicate like parts:

FIG. 1 is a top elevational view of my skatewheel conveyor pallet;

FIG. 2 is a perspective view of the underside of the pallet;

FIG. 3 is a perspective view of the pallet on a segment of a skatewheel conveyor;

FIG. 4 is a fragmentary sectional view taken on the line 4—4 of FIG. 1;

FIG. 5 is a sectional view taken on the line 5—5 of FIG. 4;

FIG. 6 is a sectional view taken on the line 6—6 of FIG. 3;

FIG. 7 is an enlarged fragmentary sectional view taken on the line 7—7 of FIG. 6;

FIG. 8 is a fragmentary sectional view of three stacked pallets, one inverted, taken on the line 4—4 of FIG. 1.

DESCRIPTION OF THE PREFERRED EMBODIMENTS

In FIG. 1, there is shown the skatewheel conveyor pallet 10 having an upper load bearing surface defined by an open latticework grid 12. Visible through the grid openings 14 are a plurality of drain holes 16 in the closed bearing surface 18 along the underside of the pallet. On opposite ends of the pallet are stops 20 adapted to engage the grid openings of another similar pallet in an inverted stacked position to prevent relative sliding motion thereof.

In FIG. 2, the underside of the pallet is shown having a pair of depending skirt members 22 disposed along opposite side edges of the pallet and extending below the level of the upper surface of the pallet. Such skirt members guide the pallet as it moves along the skatewheel conveyor. In the form of the invention shown in FIGS. 1–4 inclusive, said skirt members have outwardly bevelled ends 23 to provide feed guide means for the pallet. The closed bearing surface 18 extending adjacent to each skirt member along the underside of the pallet and inboard of each said skirt member will be understood to engage the wheels of the skatewheel conveyor. In the form of the invention shown in FIGS. 1–8, inclusive, the grid openings 14 extend through the pallet from the upper surface to the portion of the lower surface which is between the bearing surfaces 18. Such grid openings permit, if desired, the load to be lashed or otherwise secured to the pallet by methods well known in the art. In order to control the speed of the pallet on the conveyor, there is a braking means 24 extending centrally along the underside of the pallet midway between the skirt members 22 adapted to engage rubber wheels on the skatewheel conveyor. In one form of the invention, the braking means 24 consists of a gear-toothed rack.

As shown in FIG. 3, the skatewheel pallet 10 is self-guiding along a skatewheel conveyor 81. It will be understood that the pallet 10 rides on the wheels 87 of the conveyor. The skatewheel conveyor shown has side wheels 83 as is well-known in the art. However, the skatewheel pallet which is the subject of this invention is equally adapted for use on conveyors without such side wheels. Rubber wheels 85 engage the braking means 24 of FIG. 2 in order to control the speed of the pallet on the conveyor.

FIGS. 4–5 are longitudinal and transverse sectional views, respectively, of the pallet 10. The relation of the bearing surface 18 to the skirt members 22 is more clearly seen. The drain holes 16 will be seen to drain from the latticework grid opening 14 through the bearing surface 18.

In the form of the invention disclosed in FIGS. 6–7, inclusive, the braking means 24 comprises a gear-toothed rack which engages rubber wheels 85 of a skatewheel conveyor 81. It will be seen that the bearing surface 18 engages the conveyor wheels 87 as the pallet 10 moves along the conveyor guided by the skirt members 22.

By stacking the pallet 10' in an inverted position onto pallet 10 as shown in FIG. 8, the stops 20 of pallet 10' are engaged in the grid openings 14 of pallet 10, thereby preventing relative sliding motion of the pallets.

As various changes in the construction and arrangement may be made without departing from the spirit of the invention, as will be apparent to those skilled in the art, reference will be had to the appended claims for a definition of the limits of the invention.

I claim:

1. A skatewheel conveyor pallet comprising an open latticework grid defining an upper load bearing surface, an underside adapted for contact with the skatewheels of said conveyor, a pair of depending skirt members disposed along opposite side edges of said pallet and extending below the level of said upper surface, said skirt members adapted to extend beyond the sides of said conveyor and provide guide means for said pallet as it moves along said conveyor, a closed bearing surface extending adjacent each skirt member along the underside of said pallet and inboard of each said skirt member for engagement with skatewheels of said conveyor, braking means extending centrally along the underside of said pallet midway between said skirt members adapted to engage rubber wheels on said conveyor and thereby slow the speed of said pallet along said conveyor, openings in said grid extending through said pallet from said upper surface to said lower surface, drain means in said bearing surfaces, said braking means comprised of a gear-toothed rack.

2. A skatewheel conveyor pallet comprising an open latticework grid defining an upper load bearing surface, an underside adapted for contact with the skatewheels of said conveyor, a pair of depending skirt members disposed along opposite side edges of said pallet and extending below the level of said upper surface, said skirt members adapted to extend beyond the sides of said conveyor and provide guide means for said pallet as it moves along said conveyor, a closed bearing surface extending adjacent each skirt member along the underside of said pallet and inboard of each said skirt member for engagement with skatewheels of said conveyor, braking means extending centrally along the underside of said pallet midway between said skirt members adapted to engage rubber wheels on said conveyor and thereby slow the speed of said pallet along said conveyor, openings in said grid extending through said pallet from said upper surface to said lower surface, drain means in said bearing surfaces, said braking means comprised of a gear-toothed rack, outwardly bevelled ends on said skirt members to provide feed guide means for said pallet.

3. A skatewheel conveyor pallet comprising an open latticework grid defining an upper load bearing surface, an underside adapted for contact with the skatewheels of said conveyor, a pair of depending skirt members disposed along opposite side edges of said pallet and extending below the level of said upper surface, said skirt members adapted to extend beyond the sides of said conveyor and provide guide means for said pallet as it moves along said conveyor, a closed bearing surface extending adjacent each skirt member along the underside of said pallet and inboard of each said skirt member for engagement with skatewheels of said conveyor, braking means extending centrally along the underside of said pallet midway between said skirt members adapted to engage rubber wheels on said conveyor and thereby slow the speed of said pallet along said conveyor, openings in said grid extending through said pallet from said upper surface to said lower surface, drain means in said bearing surfaces, said braking means comprised of a gear-toothed rack, outwardly bevelled ends on said skirt members to provide feed guide means for said pallet and stop means disposed on said upper surface at opposite ends thereof for engaging the grid openings of another similar pallet in an inverted stacked position to prevent relative sliding motion thereof.

* * * * *